United States Patent Office 3,833,687
Patented Sept. 3, 1974

3,833,687
COMPOSITION OF A POLYPHENYLENE ETHER, A BLOCK COPOLYMER OF A VINYL AROMATIC COMPOUND WITH A CONJUGATED DIENE AND A GRAFT INTERPOLYMER OF AN ACRYLIC MONOMER WITH A DIENE RUBBER
Gim F. Lee, Jr., Albany, N.Y., assignor to General Electric Company
No Drawing. Filed Aug. 23, 1972, Ser. No. 283,091
Int. Cl. C08f 15/00, 19/00
U.S. Cl. 260—876 R    12 Claims

ABSTRACT OF THE DISCLOSURE

There are provided compositions comprising (a) a polyphenylene ether, (b) a normally rigid block copolymer of a vinyl aromatic compound and a conjugated diene, and (c) a graft interpolymer of an acrylate monomer and a diene rubber. The three-component composition provides unexpected improvements in toughness in parts molded therefrom and such properties are improved without substantially impairing gloss or surface appearance.

This invention relates to novel resin compositions and more particularly, to polymer compositions comprising a polyphenylene ether, a normally rigid block copolymer of a vinyl aromatic compound and a conjugated diene and a graft interpolymerization product of an acrylic monomer, or a mixture thereof with a styrene monomer, and a diene rubber.

Background of the Invention.—The polyphenylene ethers are known and described in numerous publications including Hay, U.S. 3,306,874 and 3,306,875 and Stamatoff U.S. 3,257,357 and 3,257,358. The high molecular weight polyphenylene ethers are high performance engineering thermoplastics possessing relatively high melt viscosities and softening points—i.e., in excess of 275° C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by combining them with other resins. For example, one method for improving the melt processability of the polyphenylene ethers is disclosed in a commonly-assigned patent, U.S. 3,379,792, incorporated herein by reference. According to this patent, flow properties of the polyphenylene ethers are improved by combining with from about 0.1 to 25 parts by weight of a polyamide. In another commonly-assigned patent, U.S. 3,361,851, a polyphenylene ether composition comprising a polyphenylene ether combined with a polyolefin is disclosed. The polyolefin is added to improve impact strength and resistance to aggressive solvents. In a third commonly-assigned patent, U.S. 3,383,435, there are provided means for simultaneously improving the melt processability of the polyphenylene ether resins while simultaneously up-grading many properties of polystyrene homopolymer and random copolymer resins. The invention of U.S. 3,383,435 is based upon the discovery that the polyphenylene ether resins and such polystyrene resins, including rubber modified polystyrene resins, are combinable in all proportions and result in compositions having many properties improved over those of either of the components.

One preferred embodiment of U.S. 3,383,435 is a composition comprising a high-impact, rubber reinforced polystyrene and a poly(2,6-dialkyl-1,4-phenylene)ether. This composition was preferred because it provided the aforementioned objectives of improving the melt-processability properties of the polyphenylene ether resin and provided the further advantage of improving impact resistance of parts molded from the blend. Furthermore, such compositions of polyphenylene ethers and high impact polystyrenes could be custom-formulated to provide predetermined properties ranging between those of the polystyrene and those of the polyphenylene ether by controlling the ratio of the two polymers. The reason for this is that the compositions exhibit a single set of thermodynamic properties rather than two distinct sets of properties—i.e., one for each of the components as is typical with blends of prior art.

Preferred embodiments of the said U.S. 3,383,435, comprise compositions of polyphenylene ether resins and rubber modified polystyrene resins, the latter comprising either blends of styrene resins and diene rubbers, or grafted interpolymerization products of styrene monomer onto diene rubber backbones. While these are admirably suited for many commercial uses, it has been found that increasing the diene rubber content to enhance impact strength is limited above certain rubber levels by a tendency to lower the surface appearance, e.g., gloss, and resistance to aggressive solvents, e.g., gasoline.

In copending application, Ser. No. 283,092, by the present applicant, and filed concurrently herewith, it is disclosed that adding controlled amounts of normally rigid block copolymers of vinyl aromatic monomers (A) and conjugated dienes (B) of the A-B-A type, to compositions of polyphenylene ether resins and rubber modified polystyrenes has an unexpected and marked enhancing effect on impact resistance, and higher impact strengths are obtained than would be predicted from the rubber content alone. Moreover, the normally rigid block copolymers of this type seem highly specific in their behavior in that they do not very effectively modify the impact strength of the polyphenylene ether component alone.

In R. P. Kambour, U.S. 3,639,508, it is disclosed that block copolymers of the A-B and A-B-A type having from 10 to 90% by weight of A units can be blended with polyphenylene ether resins or matrixes of polyphenylene ether resins and polystyrene *homopolymers* to give improved heat distortion and transparency. There is no disclosure of ternary blends comprising the block copolymers, polyphenylene ether resins and graft copolymers of polystyrene and rubber and Kambour shows only that such graft copolymers cause a very considerable decrease in transparency in binary blends with polyphenylene ethers.

In R. L. Lauchlin et al., U.S. 3,660,531 and in copending application, Ser. No. 17,976, filed Mar. 9, 1970, it is disclosed that elastomeric block copolymers can be blended with polyphenylene ether resins or matrixes of polyphenylene ether resins and polystyrene *homopolymers*, or *graft copolymers* with diene rubbers. In the patent, it is emphasized that the block copolymers must be leathery or rubbery in nature at normal, i.e., ambient temperature, and, by reference to "Properties and Structures of Polymers," A. V. Tobolsky, pages 71–78, John Wiley & Sons (1960), these normally leathery or rubbery block copolymers are stated to have Young's moduli between $10^5$ and $10^9$ dynes/cm. The patent states that polymeric materials which are glassy at ambient temperature, i.e., those which are normally rigid, and, which have Young's moduli in excess of $10^9$ dynes/cm.$^2$ by reference to the Tobolsky work, are not at all acceptable in the disclosed compositions.

In the copending application of V. Abolins and D. L. Reinhard, Ser. No. 873,663, filed on Nov. 3, 1969, it is disclosed that compositions comprising a polyphenylene ether resin, an interpolymer of an acrylic resin and a diene rubber and, optionally, a rubber modified high impact polystyrene have excellent impact strength and surface appearance, although at levels of above about 25 wt. % of the acrylic component, the physical properties and impact begin to drop off.

It has now been discovered that if compositions are provided comprising (a) a polypheneylene ether resin, (b) a normally rigid block copolymer of a vinyl aromatic compound and a conjugated diene, and (c) a graft of an acrylic monomer or a mixture thereof with a vinyl aromatic compound onto a diene rubber backbone, molded workpieces with high gloss surface appearance and optimum physical properties, particularly tensile strength and elongation, are obtained having at least three times the impact strength obtainable with the normally rigid block copolymer as the only rubber-containing additive; about 50% greater than those containing both the block copolymer and mass polymerization grafted rubber modified polystyrenes; and at least the same impact strength as compositions including the relatively expensive acrylicdiene rubber graft copolymer product as the only rubber-containing additive.

The new compositions differ from those of U.S. 3,383,435 because they contain a vinyl aromatic-diene block copolymer component and a graft polymer of an acrylic monomer onto a diene rubber backbone, whereas the compositions of the patent do not include these; the new compositions differ from those of Ser. No. 283,092 because they contain a graft polymer of an acrylic monomer onto a diene backbone, whereas those of the copending application do not; and they do not include a graft copolymer of a styrene onto a diene rubber backbone, whereas those of the copending application do; the new compositions differ from those of Ser. No. 873,663 because they include a normally rigid vinyl aromatic-diene block copolymer, whereas those of the copending application do not; the new compositions differ from those of U.S. 3,369,508 because they contain a graft polymer of an acrylic monomer onto a diene rubber backbone, whereas those of the patent do not; and the new compositions differ from those of U.S. 3,660,331 because the block copolymers contained herein are normally rigid, i.e., glassy at room temperature, and have a Young's modulus of greater than $10^9$ dynes/cm.$^2$, whereas those of the patent are always normally resilient and leathery, i.e., elastomeric, and have a Young's modulus of $10^5$–$10^9$ dynes/cm.$^2$, and the present compositions contain a graft polymer of an acrylic monomer onto a diene rubber backbone, whereas those of U.S. 3,660,331 do not.

Description of the Invention.—According to the present invention there are provided normally rigid thermoplastic compositions comprising (a) a polyphenylene ether resin;

(b) a normally rigid block copolymer of a vinyl aromatic compound (A) and a conjugated diene (B), of the A-B-A type, blocks (B) being of lower molecular weight than those of blocks (A); and (c) a thermoplastic interpolymerization product of a diene rubber and an acrylic monomer or a mixture of an acrylic monomer and a vinyl aromatic monomer, the combined weights of components (b) and (c) comprising from about 10 to about 80% by weight of the total resinous components in the composition, the ratio of (b) to (c) being in the range of 1:10 to 10:1 by weight.

Preferred compositions will be those in which the polyphenylene ether comprises at least 1% by weight of the total resinous components in the composition.

It is to be understood, however, that the present compositions can also include conventional amounts of conventional additives for processability, flame retardancy, stability and the like.

Preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$, titanate whiskers, glass flakes and fibers and the like. Such reinforcements will be present in an amount of, e.g., 2 to 90% by weight, preferably 10 to 60% by weight. Especially preferred as a reinforcement is fibrous glass.

In preferred compositions the polyphenylene ether resins in component (a) will be those having repeating structural units of the formula

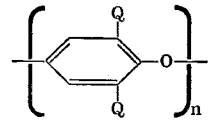

wherein the oxygen ether atom of one unit is connected to the benzene nucleus of the next adjoining unit, $n$ is a positive integer and is at least 50, and each Q is a monovalent substituent selected from the group consisting of hydrogen, halogen hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the above-mentioned patents of Hay and Stamatoff. Especially preferred polyphenylene ether resins for purposes of the present invention are those having alkyl substitution in the two positions ortho to the oxygen ether atom—i.e., where each Q is alkyl, most preferably, having from 1 to 4 carbon atoms. The most preferred polyphenylene ether resin for purposes of the present invention is poly(2,6-dimethyl-1,4-phenylene) ether (each Q is methyl)

With respect to component (b), normally rigid block copolymers of vinyl aromatic compounds and conjugated dienes are made by means well known in the art and are also available commercially.

Block copolymers of vinyl aromatic compounds and conjugated dienes are described in Kennedy, et al. Editor, Polymer Chemistry of Synthetic Elastomers, Interscience, Vol. 23, Part II, 1969, pages 553–559. In general, they will be of the A-B-A type in which the relative ratios of the homopolymer blocks can vary. In the compositions of this invention, however, blocks B will always be those of a conjugated diene, e.g., butadiene; isoprene; 1,3-pentadiene: 2,3-dimethyl-butadiene, and the like or mixtures of the foregoing. Blocks A will always be derived from a vinyl aromatic compound, e.g., styrene, α-methyl styrene, vinyl toluene, vinyl xylene, vinyl naphthalene, or mixtures of any of the foregoing. In the most preferred compositions, the block copolymer will have blocks A comprised of polystyrene and blocks B comprised of polybutadiene. The most preferred block copolymers will be of the radial teleblock structure, "teleblock" being used to designate copolymers with terminal block segments of one of the monomers used to produce them; in this case the terminal blocks will be vinyl aromatic, e.g., from styrene. "Radical" means a network in which the polystyrene blocks make the rubber thermoplastic (by virtue of the greater weight content) and association provides a network of plastic areas connected by flexible diene rubber blocks so the material has excellent mechanical properties without vulcanization. Although they are normally rigid, the radial teleblock polymers soften and flow with heat and can be molded and extruded in the same manner as other thermoplastic materials. They can be remolded repeatedly without loss in properties.

The ratio of the comonomers can vary broadly, so long as the average molecular weights of combined blocks B is less than that of combined terminal blocks A (and $A^1$). This appears to be necessary for the impact strength to be maximized and to obtain the unexpected enhancement. Preferably, with the above limitation, the molecular weight of the diene-derived block B will range from about 2000 to about 100,000, while that of the vinyl aromatic combined blocks A and $A^1$ will range from about 25,000 to about 1,000,000. In any event, in preferred copolymers, the aromatic compound units will comprise from about 65 to about 85% by weight and the diene units will comprise from about 15 to about 45% by weight.

The block copolymers are made by an organolithium initiated polymerization process in hydrocarbon solution using, for example, butadiene and styrene or other diene and vinyl aromatic monomers as is described in Kennedy et al., mentioned above.

In one process, the block copolymer is prepared by dissolving the conjugated diene, e.g., butadiene, in an aromatic hydrocarbon solvent, e.g., xylene, toluene, etc., and adding 0.3 to 7.5 millimoles/100 parts of monomer of an organolithium initiator, e.g., n-butyl lithium, etc. Polymerization of the diene is completed and then the vinyl aromatic compound is added and polymerization of this is completed to form the block copolymer. The product is precipitated and deactivated, e.g., with alcohol, such as ethanol or isopropanol and purified by redissolving in hydrocarbon and reprecipitating with alcohol.

In another process, the block copolymer is formed using, e.g., a secondary or tertiary alkyl lithium compound at about 100–200 parts per million based on the total weight of the monomers and a polymerization temperature in the range 20–65° C. For example, styrene is dissolved in cyclohexane at 32° C. and treated with 5530 parts per million of secondary butyl lithium. After polymerization is continued at 55–57° C. The product can be recovered as described above.

Suitable styrene-butadiene block copolymer resins are also available commercially, e.g., as KRO–1 and KRO–3 from Phillips Petroleum Company. KRO–1 contains about 73.6 wt. percent of pure polystyrene blocks, balance, polybutadiene blocks, the polybutadiene having greater than 90% of the cis-1,4-microstructure. The intrinsic viscosity of a typical sample is 0.67 dl./g. (in chloroform at 25° C.). KRO–3 is like KRO–1, but the styrene content is about 75.8 wt. percent and the intrinsic viscosity is slightly lower, 0.64 dl./g. The glass transition point of the polybutadiene segments in each case is about −90° C. KRO–1 shows a bimodal molecular weight distribution by gel phase chromatography. KRO–3 has a smaller, low molecular weight peak. Each is of the radial teleblock structure.

With respect to component (c), thermoplastic interpolymerization products of an acrylic monomer, or a mixture of an acrylic monomer and a vinyl aromatic compound, e.g., a styrene monomer, with a backbone comprising a diene rubber, e.g., one made from a conjugated diene as above defined, including acrylo-nitrile-butadiene-styrene and similar products, are made by means well known in the art and are also available commercially from a number of sources. They can range from resilient, elastomeric solids to normally rigid solids.

Generally, component (c) can be formed from a polybutadiene or a styrene-butadiene copolymer latex and an acrylic monomeric material, e.g., methyl or ethyl methacrylate, acrylonitrile, and the like, together with minor proportions of other monomers, e.g., vinylidene chloride, styrene, and the like, preferably styrene. In one manner of proceeding, from 15 to 80, preferably from 15 to 35 parts by weight of solids in a diene rubber latex is interpolymerized with from 85 to 20, preferably from 85 to 65, parts by weight of methyl methacrylate or a mixture thereof with up to about 45% by weight of styrene. The system is emulsified in a conventional way in water, e.g., with sodium oleate or similar emulsifier and a free-radical generating catalyst, e.g., methyl ethyl ketone peroxide, benzoyl peroxide, cumene hydroperoxide and the like, e.g. 0.05 to 0.5 part by weight of monomer, and a chain regulator, e.g., dodecyl mercaptan, e.g., 0.2 to 5% by weight of monomer, are added. Interpolymerization is carried out at 15 to 80° C. until the desired degree of grafting is obtained, then the product is recovered in known ways, e.g., by coagulation with calcium chloride solution, filtering, washing and drying. These techniques are described in detail in U.S. 2,857,360 and 2,943,074 both of which are incorporated herein by reference.

One suitable commercially available product of the above type for use as component (c) is designated Acryloid KM–611 and is available from Rohm & Haas Co., Philadelphia, Pa.

A detailed procedure for preparing another suitable product of the type used as component (c) will be set forth hereinafter.

The amount of normally rigid block copolymer component (b) and graft copolymer component (c) used in the present compositions can vary within broad limits. However, the contemplated compositions will contain from about 10 to about 80% by weight of (b) and (c) together, based on the total resinous components in the composition. The ratio between components (b) and (c) can vary widely also, but it is preferred to use from about 1:10 to 10:1 parts of (b) to (c).

In a preferred family of compositions of the polyphenylene ether (a) comprises from about 20 to about 90% by weight, and the normally rigid block copolymer of a vinyl aromatic compound and a conjugated diene (b) together with the grafted interpolymerization product of an acrylic monomer, or a mixture thereof with a styrene monomer, with a diene rubber (c) comprises from about 10 to about 80% by weight of the total weight of the resinous components in said composition, the ratio of (b) to (c) is in the range of 1:4 to 4:1. Especially preferred are compositions in which the polyphenylene ether (a) is poly(2,6-dimethyl-1,4-phenylene) ether and comprises from about 20 to about 60% by weight, component (b) is a normally rigid block copolymer of styrene and butadiene of the poly(styrene-butadiene) type and comprises from about 10 to about 50% by weight and the grafted interpolymerization product is of methyl methacrylate or a mixture of methyl methacrylate with a polybutadiene or a rubbery copolymer of butadiene and styrene and comprises from about 10 up to about 50% by weight of the total weight of the resinous components in the composition, and the ratio of (b) to (c) is about 1:3 and 3:1.

It should be obvious that other additives may be present in the compositions such as plasticizers, pigments, flame retardants and stabilizers in amounts varying between about 1 and 30 percent by weight of the total composition. The above-stated range for the normally rigid block copolymer resin, the polyphenylene ether resin and the grafted acrylic onto a diene rubber backbone resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous form—as the case may be—extruding the blend and chopping into pellets suitable for molding to shape by means conventionally used to mold normally solid thermoplastic compositions.

The following procedure may be used to prepare a graft interpolymer suitable for use in preparing the present compositions:

PROCEDURE

The following formulation is polymerized by heating at 60° C. for 24 hours:

|  | Parts by weight |
| --- | --- |
| Butadiene-1,3 | 70.0 |
| Styrene | 30.0 |
| Water | 150.0 |
| Sodium lauryl sulfate | 5.0 |
| Potassium persulfate | 0.2 |
| Dodecyl mercaptan | 0.05 |

The unreacted monomers are removed under vacuum. The latex is emulsified into the following formulation:

|  | Parts by weight |
| --- | --- |
| Methyl methacrylate | 50.0 |
| Butadiene styrene rubbery latex solids | 50.0 |
| Water | 150.0 |
| Sodium lauryl sulfate | 3.75 |
| Benzoyl peroxide | 0.05 |
| Dodecyl mercaptan | 0.22 |

The emulsion is polymerized at 60° C. for 24 hours, coagulated with calcium chloride, washed and dried under vacuum. If a polybutadiene latex is used in place of the rubbery butadiene styrene copolymer, methyl methacrylate will be grafted onto a polybutadiene backbone.

Description of the Preferred Embodiments.—The advantages obtained by providing compositions of a polyphenylene ether resin, a normally vinyl aromatic, conjugated diene A-B-A type block copolymer and a graft interpolymer of an acrylic monomer onto a diene rubber backbone are illustrated in the following examples which are set forth as a further description of the invention, but are not to be construed as limiting the invention thereto.

EXAMPLES 1–3

The following formulations are mechanically blended then co-extruded in a ¾" Wayne-type extruder then molded into test pieces in a 3 oz. Newbury injection molding machine. The physical tests are carried out by the following procedures: ⅛" notch Izod impact strength, ASTM D–256–56; and Tensile strength and elongation, ASTM D–639–61T. Formulations and physical properties are set out in the Table:

TABLE

Compositions of polyphenylene ether, butadiene-styrene A-B block copolymer and graft interpolymer of acrylate and diene rubber

| Example | 1A [1] | 1 | 2 | 3 | 3A [1] |
| --- | --- | --- | --- | --- | --- |
| Ingredients (parts by weight): |  |  |  |  |  |
| Poly(2,6-dimethyl-1,4-phenylene) ether [2] | 40 | 40 | 40 | 40 | 40 |
| Poly(butadiene-styrene) A-B-A blocks [3] | 60 | 45 | 30 | 15 | |
| Grafted interpolymer of methyl methacrylate and diene rubber [4] | | 15 | 30 | 45 | 60 |
| Properties: |  |  |  |  |  |
| Tensile strength, p.s.i. | 7,200 | 6,800 | 6,900 | 6,500 | 5,900 |
| Tensile yield, p.s.i. | 8,100 | 7,100 | 6,800 | 6,000 | 5,600 |
| Elongation, percent | 77 | 73 | 79 | 75 | 60 |
| Izod impact strength, ft.-lbs./in. notch | 1.7 | 7.1 | 6.8 | 7.5 | 7.3 |

[1] Control.
[2] General Electric Company, PPO in powder form, intrinsic viscosity 0.4–0.65 dl./g.
[3] Phillips Petroleum Co., KRO-3, block copolymer of butadiene, styrene; 75.8% polystyrene content, balance polybutadiene (having greater than 90% cis-1,4-microstructure), intrinsic viscosity about 0.64 dl./g.
[4] Rohm & Haas Co., Acryloid KM-611, graft interpolymer of methyl methacrylate and polybutadiene rubber backbone, containing about 30% by weight of diene units.

It is seen that the compositions according to this invention (Examples 1–3) have very high impact strengths in comparison to control sample 1A and permit a three-fold reduction in the expensive grafted acrylic component without sacrificing impact strength while causing elevation in tensile strength and elongation (compare, control 3A). Furthermore, with Example 3 it is demonstrated that replacing a one-fourth of the acrylic component with the block copolymer component leads to even higher impact strengths, tensile strengths and elongation than can be achieved with the grafted acrylic component alone.

EXAMPLE 4

The following formulations is blended, molded and tested by the procedure of Examples 1–3:

| Ingredients: | Parts by weight |
| --- | --- |
| Poly(2,6-dimethyl - 1,4 - phenylene)ether (as in Examples 1–3) | 20 |
| Normally rigid block copolymer resin (as in Examples 1–3) | 30 |
| Grafted interpolymer of methyl methacrylate and diene rubber (as in Examples 1–3) | 30 |
| ⅛ inch fibrous glass reinforcement | 20 |

A reinforced composition according to this invention is obtained.

Other modifications can be made based on the teachings of the foregoing specific examples.

For example, if the procedure of Examples 1–3 is repeated, substituting for the block copolymer of type A-B-A containing homopolymer blocks of polystyrene and polybutadiene, a mixture thereof with 25% by weight of a normally rigid type A-B-A[1] containing styrene-butadiene-α-methyl styrene blocks, a composition according to this invention will be obtained.

If the procedure of Examples 1–3 is repeated, substituting for the graft interpolymer of methyl methacrylate with about 30 wt. percent of diene rubber units, the graft interpolymerization product of methyl methacrylate onto a rubbery butadiene-styrene copolymer prepared by the above Procedure, or a similar product prepared by emulsion grafting a 75:25 wt. ratio of methyl methacrylate-styrene monomer mixture onto the same diene rubber, compositions according to this invention will be obtained.

If the procedure of Examples 1–3 is repeated, substituting for the block copolymer of polystyrene-polybutadiene, respectively block copolymers of polystyrene-polyisoprene; or
polyisoprene-poly(α-methylstyene)

high impact compositions according to this invention will be obtained.

If the procedure of Examples 1–3 is repeated, substituting for the block copolymer, block copolymers having the following indicated weight percent compositions:

Polystyrene-polybutadiene _____ 65–35
Polystyrene-polybutadiene _____ 85–15 high impact compositions according to this invention will be obtained.

If the following polyphenylene ethers are substituted for poly(2,6-dimethyl-1,4-phenylene)ether in the formulation of Examples 1–3:

poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether and
poly(2-ethyl-6-propyl-1,4-phenylene)ether, compositions according to this invention will be obtained.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A normally rigid thermoplastic composition comprising
   (a) a polyphenylene ether resin;
   (b) a normally rigid block copolymer of a vinyl aromatic compound (A) and a conjugated diene (B), of the A-B-A type, blocks (B) being of lower average molecular weight than those of blocks (A), wherein the aromatic compound units comprise from about 65 to about 85% by weight and the diene units comprise from about 15 to about 45% by weight of said block polymers; and
   (c) a thermoplastic interpolymerization product of a diene rubber and an acrylic monomer or mixture of an acrylic monomer and a vinyl aromatic monomer, wherein said interpolymerization product is comprised of 20 to about 85% interpolymerized acrylic monomer or a mixture thereof with said vinyl aromatic monomer and from about 80 to 15% by weight of said diene rubber, wherein the combined weight of components (b) and (c) comprises from about 10 to about 80% by weight of the total resinous components in the composition, the ratio of (b) to (c) being in the range of 1:10 to 10:1 by weight, and wherein said polyphenylene ether resin comprises from about 90 to about 20% by weight of the total resinous components in the composition.

2. A composition as defined in Claim 1 wherein component (a) is a polyphenylene ether of the formula

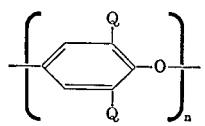

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halo hydrocarbonoxy radicals having at least two carbon atoms between the halogen atom and the phenyl nucleus.

3. A composition as defined in Claim 2 wherein each Q is alkyl having from 1 to 4 carbon atoms.

4. A composition as defined in Claim 2 wherein each Q is methyl.

5. A composition as defined in Claim 1 wherein, in component (b), the vinyl aromatic compound (A) is selected from styrene, α-methyl styrene, vinyl toluene, vinyl xylene and vinyl naphthalene and the conjugated diene compound (B) is selected from butadiene, isoprene, 1,3-pentadiene or 2,3-dimethylbutadiene.

6. A composition as defined in Claim 5 wherein, in component (b) (A) is a styrene blcok, (B) is a butadiene block, the polymer being of the radial teleblock structure.

7. A composition as defined in Claim 1 wherein component (c) is an interpolymer of methyl methacrylate or a mixture of methyl methacrylate and styrene grafted onto a diene rubber backbone.

8. A composition as defined in Claim 7 wherein component (c) contains about 20 to about 85% of interpolymerized methyl methacrylate or a mixture thereof with styrene and from about 80 to 15% by weight of a polybutadiene or a rubbery copolymer of butadiene and styrene.

9. A composition as defined in Claim 7 wherein the polyphenylene ether is poly(2,6-dimethyl-1,4-phenylene) ether.

10. A composition as defined in Claim 1 wherein the polyphenylene ether (a) comprises from about 20 to about 90% by weight, and the normally rigid block copolymer of a vinyl aromatic compound and a conjugated diene (b) together with the grafted interpolymerization product of an acrylic monomer or a mixture thereof with styrene monomer with a diene rubber (c) comprises from about 10 to about 80% by weight of the total weight of the resinous components in said composition, and the ratio of (b) to (c) is in the range of about 1:4 to 4:1.

11. A composition as defined in Claim 10 wherein said polyphenylene ether (a) is poly(2,6-dimethyl-1,4-phenylene)ether and comprises from about 20 to about 60% by weight, the normally rigid block copolymer (b) comprises styrene and butadiene and is of the poly(styrene-butadiene) type and comprises from about 10 to about 50% by weight and the grafted interpolymerization product (c) is of methyl methacrylate or a mixture of methyl methacrylate and styrene with a polybutadiene or a rubbery copolymer of butadiene and styrene and comprises from 10 to about 50% by weight of the total weight of the resinous components in said composition, the ratio of (b) to (c) is about 1:3 to 3:1.

12. A reinforced composition as defined in Claim 1 including a reinforcing amount of fibrous glass.

References Cited
UNITED STATES PATENTS

| | | | |
|---|---|---|---|
| 3,639,508 | 2/1972 | Kambour | 260—876 R |
| 3,383,434 | 5/1968 | Cizek | 260—874 |
| 3,639,506 | 2/1972 | Haaf | 260—876 |
| 3,663,654 | 5/1972 | Haaf | 260—876 |
| 3,663,661 | 5/1972 | Katchman | 260—876 |

PAUL LIEBERMAN, Primary Examiner

U.S. Cl. X.R.

260—41 AG, 41 B, 41 R, 41.5 R, 47 ET, 880 R, 880 B

UNITED STATES PATENT AND TRADEMARK OFFICE
CERTIFICATE OF CORRECTION

PATENT NO. : 3,833,687
DATED : September 3, 1974
INVENTOR(S) : Gim F. Lee, Jr.

It is certified that error appears in the above-identified patent and that said Letters Patent are hereby corrected as shown below:

Column 3, line 20, after "impact" insert --strengths--.

Column 4, line 36, after "halogen" insert a comma.

Column 5, line 1, "'Radical'" should be --"Radial"--.

Column 6, line 39, "of" (second occurrence) should be deleted;

line 47, after "composition," --and-- should be inserted.

Column 7, line 35, after "normally" --rigid-- should be inserted.

Column 8, line 12, "formulations" should be --formulation--.

Column 9, line 13, "polymers" should be --copolymers--.

Column 10, line 2, "blcok" should be --block--.

Signed and Sealed this sixteenth Day of September 1975

[SEAL]

Attest:

RUTH C. MASON
Attesting Officer

C. MARSHALL DANN
Commissioner of Patents and Trademarks